United States Patent
Obaidi

(10) Patent No.: US 11,645,688 B2
(45) Date of Patent: May 9, 2023

(54) USER-BEHAVIOR-BASED PREDICTIVE PRODUCT AND SERVICE PROVISIONING

(71) Applicant: T-Mobile USA, Inc., Bellevue, WA (US)

(72) Inventor: Ahmad Arash Obaidi, Tracy, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 310 days.

(21) Appl. No.: 16/052,947

(22) Filed: Aug. 2, 2018

(65) Prior Publication Data

US 2020/0043066 A1    Feb. 6, 2020

(51) Int. Cl.
| | |
|---|---|
| *G06Q 30/06* | (2012.01) |
| *G06Q 30/0601* | (2023.01) |
| *H04L 9/40* | (2022.01) |
| *G06N 20/00* | (2019.01) |
| *H04W 12/63* | (2021.01) |

(52) U.S. Cl.
CPC ......... *G06Q 30/0601* (2013.01); *G06N 20/00* (2019.01); *H04L 63/0861* (2013.01); *H04W 12/63* (2021.01)

(58) Field of Classification Search
CPC . G06Q 30/0601; G06N 20/00; H04L 63/0861
USPC ...................................................... 705/26.1
See application file for complete search history.

(56) References Cited

U.S. PATENT DOCUMENTS

| | | | | |
|---|---|---|---|---|
| 7,207,067 B2* | 4/2007 | Feng | ..................... | H04L 63/104 705/1.1 |
| 8,953,764 B2* | 2/2015 | Bouzid | ............. | H04M 3/42204 379/201.05 |
| 9,477,574 B2* | 10/2016 | Tumanov | ............ | G06F 11/3438 |
| 10,362,137 B2* | 7/2019 | Srinivasaraghavan | ...................... | H04L 43/04 |

(Continued)

FOREIGN PATENT DOCUMENTS

| | | | | | |
|---|---|---|---|---|---|
| CN | 104331816 A | * | 2/2015 | | |
| CN | 112819495 A | * | 5/2021 | | |
| CN | 112836996 A | * | 5/2021 | ....... | G06Q 10/06315 |

OTHER PUBLICATIONS

Yang Wang, "A Framework for Privacy-Enhanced Personalization", 2010, Dissertation UC Irvine (Year: 2010).*

(Continued)

*Primary Examiner* — Matthew E Zimmerman
*Assistant Examiner* — Thomas Joseph Sullivan
(74) *Attorney, Agent, or Firm* — Han Santos, PLLC

(57) ABSTRACT

A prediction engine may use the user behavior data of a user as collected by user devices to assist the user with obtaining products and services. The prediction engine may predict that a user desires to obtain a product or a service from a vendor based on user behavior data collected by applications on one or more user devices. The collected user behavior data may include a conversation of the user with one or more other persons. The prediction engine may trigger an application on a user device to prompt the user to confirm that the user requests to proceed with obtain the product or the (Continued)

service from the vendor. The prediction engine may notify the vendor to provide the product or the service to the user in response to receiving a confirmation from the user that the user requests to proceed with obtaining the product or the service.

18 Claims, 6 Drawing Sheets

(56) References Cited

U.S. PATENT DOCUMENTS

| | | | | |
|---|---|---|---|---|
| 2007/0150387 | A1* | 6/2007 | Seubert | G06Q 40/00 705/31 |
| 2013/0218687 | A1* | 8/2013 | Sohangir | G06Q 50/01 705/14.66 |
| 2014/0136443 | A1* | 5/2014 | Kinsey, II | G06Q 30/0282 705/347 |
| 2014/0258042 | A1* | 9/2014 | Butler | G06Q 50/16 705/26.63 |
| 2014/0278795 | A1* | 9/2014 | Satyamoorthy | G06Q 30/0201 705/7.29 |
| 2015/0172296 | A1* | 6/2015 | Fujioka | H04L 63/107 726/29 |
| 2015/0178788 | A1* | 6/2015 | Weber | H04N 21/25891 705/14.66 |
| 2015/0348001 | A1* | 12/2015 | Van Os | G06Q 20/3821 705/44 |
| 2015/0348162 | A1* | 12/2015 | Morris | G06Q 30/0631 705/26.7 |
| 2019/0089699 | A1* | 3/2019 | Krishnamurthy | H04W 4/16 |
| 2019/0180329 | A1* | 6/2019 | Chetlur | H04L 9/3239 |

OTHER PUBLICATIONS

Liu, Xiaoman et al, "Using support vector machine for online purchase predication", Jul. 24, 2016, 2016 International Conference on Logistics, Informatics and Service Sciences (LISS) (Year: 2016).*
Sakar, C. Okan et al, "Real-time prediction of online shoppers' purchasing intention using multilayer perceptron and LSTM recurrent neural networks", Jul. 18, 2017, The Natural Computing Applications Forum 2018 (Year: 2017).*

* cited by examiner

USER-BEHAVIOR-BASED PREDICTIVE PRODUCT AND SERVICE PROVISIONING

BACKGROUND

Consumers have access to multiple smart devices that make their lives easier and more enjoyable. These smart devices may include smartphones, home voice user interface (VUI) devices, and vehicle VUI devices. A consumer may use a smartphone to make voice calls, communicate via email and text messages, update social media pages, stream media, browse websites, check weather and traffic, and so forth. The consumer may use a home VUI device to control home automation, access news and entertainment, request information about the world around them, keep in touch with their friends, play games, and so forth. Likewise, the consumer may use a vehicle VUI device to activate or deactivate vehicle functions, check traffic patterns, navigate to destinations, and so forth. Thus, consumers are becoming more comfortable with the idea of sharing their verbal communications and user behavior information with smart devices and service providers that provide backend functionalities for the smart devices.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
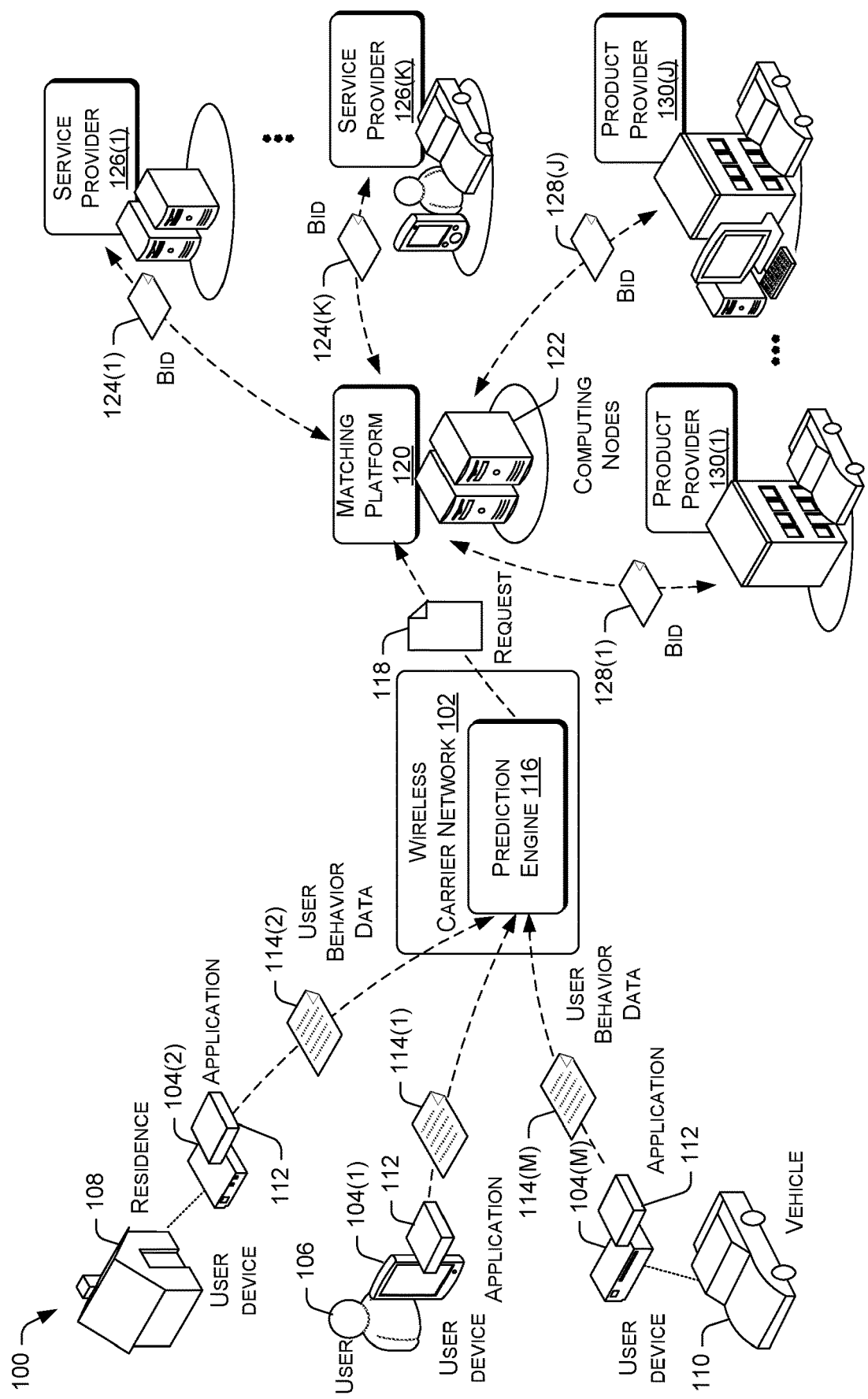
FIG. 1 illustrates an example architecture for a wireless carrier network to use user behavior data collected by user devices to predictively offer products and services to a user.

This disclosure is directed to techniques that enable a wireless communication carrier to provide a matching platform for a vendor to predictively offer products or services to a user based on user behavior data that is collected by user devices of the user. The user devices may include a smartphone of the user, a home smart device of the user, a vehicle smart device of the user, and/or so forth. The user behavior data of the user that is collected by the user devices may include verbal communications. For example, the verbal communications may include conversation of the user with another person (whether in-person or during a telecommunication call), user utterances of the user, and spoken user commands of the user to other applications installed on the user device. The user behavior data may further include user application inputs and data collected by the sensors of a user device. The user application inputs may include key or gesture inputs into applications that are installed on the user device. For example, the user inputs may include an address inputted into a navigation application, a selection of a city in a weather application, a note or a message that is inputted by the user into a notation application, an event that is inputted into a calendar application, purchase patterns of the user in online shopping applications, and/or so forth. The data collected by the sensors of the user device may include Global Positioning System (GPS) geolocation data, camera image or video data, compass reading data, accelerometer data, etc.

The user behavior data are collected by an assistant application installed on each user device of the user after the user has explicitly granted permission for the collection of user behavior data by the application. Such permission-based data collection is designed to protect the user privacy of the user. The assistant applications on the user devices may transmit the user behavior data to the wireless communication carrier. In turn, the wireless communication carrier may use a prediction engine to analyze the user behavior data of the user to predict whether the user desires to obtain a product or service. For example, the analysis of the user behavior data may indicate that the user desires to purchase certain items from a retailer, to pick up a specific item from a certain location, to travel by car to a specific address, to obtain information regarding a particular business, etc. Thus, the service that is desired by the user may be an in-person service that is performed by a person (e.g., pick up a package). Alternatively, the service that is desired by the user may be a service that is capable of being performed by a machine (e.g., automatically generating an analysis report on a business).

Subsequently, the wireless communication carrier may prompt the user to confirm that the user wants to obtain the product or service. Following a confirmation by the user, the wireless communication carrier may use a matching platform that is operated by the wireless communication carrier to find a suitable vendor that is willing to provide the product or service to the user. The suitable vendor may be one of the vendors that have registered with the matching platform to offer products and services to the subscribers of the wireless communication carrier. In various embodiments, the vendors may offer bids for providing a product or service to the user. For example, if the user desires to travel by vehicle to a particular address, multiple rideshare drivers may bid on the opportunity to take the user to the particular address at different price points. In another example, multiple analytic service providers may offer bids for generating a particular business report that is desired by the user, in which the bids include the service fees that are charged by the analytic service providers. In some embodiments, the matching platform may use blockchain technology to store the transaction records of the matching platform in a distributed and immutable manner.

The wireless communication carrier may use the assistant application to communicate the bids of the vendors for providing the product or service to the user. In turn, the user may use the assistant application to select a vendor to provide the product or service. For example, the user may select the vendor based on the cost for the product or service offered, reputation of the vendor, timeliness of promised service performance or product delivery, location of the vendor in proximity to the user, and/or so forth. Following the selection, the product or service is delivered by the selected vendor to the user for the agreed upon cost.

The techniques may enable a wireless communication carrier to provide additional services to its subscribers through assistant applications that are installed on user devices. The ability of an assistant application to automatically predict user desire for products or services may offer a convenient way for the user to obtain a product or a service in a timely manner without using additional time and resources to seek out vendors. Further, the matching platform may automatically match up vendors of products and services that offer the most competitive pricing to subscribers of the wireless communication carrier that desire such products or services. The techniques described herein may be implemented in a number of ways. Example implementations are provided below with reference to the following figures.

Example Architecture

FIG. 1 illustrates an example architecture 100 for a wireless carrier network to use user behavior data collected by user devices to predictively offer products and services to a user. The wireless carrier network 102 of a wireless communication carrier may provide a wide range of mobile communication services, as well as ancillary services and features, to subscribers and associated mobile device users. The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network by a wide area network (WAN). Each regional portion of the wireless carrier network 102 may include one or more RANs and a regional circuit and/or packet switched network and associated signaling network facilities. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth. In some embodiments, the core network of the wireless carrier network 102 may accessed via wired or wireless local area networks (LANs). For example, a wireless local area network may be a network that is established using Wi-Fi or Bluetooth standards and hardware.

In various embodiments, the wireless carrier network 102 may provide telecommunication services to user devices 104(1)-104(M) of a user 106. In various embodiments, the user devices may include mobile handsets, smartphones, routers, home smart devices, vehicle smart devices, tablet computers, personal digital assistants (PDAs), smart watches, and/or electronic devices. For example, the user device 104(1) may be a smartphone that is carried by the user 106 on the person of the user. The user device 104(2) may be a smart device at a home 108 of the user 106 that is used to control home automation, provide news and entertainment, request information about the world around them, keep in touch with their friends, play games, and so forth. The user device 104(M) may be an infotainment device on a vehicle 110 that the user 106 uses to activate or deactivate vehicle functions, check traffic patterns, navigate to destinations, and so forth.

Each of the user device 104(1)-104(M) may be equipped with a copy of the assistant application 112. The assistant application 112 may be an over-the-top (OTT) application that is provided by the operator of the wireless carrier network and installed on the user device. The assistant application 112 is responsible for collecting the user behavior data of the user device following user consent to the data collection. The user behavior data collected by each copy of the assistant application 112 may include speech. For example, the speech may include conversation of the user with another person (whether in-person or during a telecommunication call), user utterances of the user, and spoken user commands of the user to other applications installed on the user device. In various embodiments, the speech may be pick up by a microphone of the user device. Alternatively, the speech in the form of a conversation may be picked up by a telephony application on the user device during a telecommunication call.

The user behavior data that is collected by the assistant application 112 may further include user application inputs and data provided by the sensors of a corresponding user device. The user application inputs may include key or gesture inputs to applications that are installed on the user device. For example, the user application inputs may include an address input to a navigation application, a selection of a city in a weather application, a note or a message that is inputted by the user into a notation application, an event that is inputted into a calendar application, purchase patterns of the user on online shopping applications, and/or so forth. The sensor data provided by the sensors of the user device may include Global Positioning System (GPS) geolocation data, camera image or video data, compass reading data, accelerometer data, etc. For example, the user behavior data of the user 106 that is collected via the user devices 104(1)-104(M) may be the user behavior data 114(1)-114(M), respectively.

However, regardless of whether the user 106 has consented to the collection of a specific type of user behavior data, the assistant application 112 may be configured to only collect the specific type of user behavior data when it is legal to do so in the corresponding legal jurisdiction. For example, the assistant application 112 may periodically send a geolocation of the user device to the prediction engine 116. In turn, the prediction engine 116 may use a database of privacy rules and regulations to determine the types of user behavior data that the wireless carrier network 102 is permitted to collect at the geolocation under the applicable privacy rules and regulations of the corresponding legal jurisdiction. As such, the prediction engine 116 may configure the assistant application 112 to refrain from or suspend the collection of one or more specific types of user behavior data when the collection is prohibited by the privacy rules and regulations.

The user devices 104(1)-104(M) may send the collected user behavior data 114(1)-114(M) to the wireless carrier network 102. In various embodiments, each user device may send the data via a communication link provided by the wireless carrier network 102, or a communication link that is provided by an alternative network in the form of a local area network (LAN), a larger network such as a wide area network (WAN), or a collection of networks, such as the Internet. Each batch of user behavior data that is sent by a user device may be labeled with metadata that includes a device identifier of the user device that collected the batch, the date and time of the collection, a corresponding application identifier of an application that received an user application input included in the batch, a corresponding identifier of a sensor that collected sensor data for the batch, and/or so forth.

The collected user behavior data 114(1)-114(M) of the user 106 may be analyzed by a prediction engine 116 of the wireless carrier network 102 to predict whether the user desires to obtain a product or a service. The prediction engine 116 may be executed by one or more computing devices that reside in the core network of the wireless carrier network 102.

In various embodiments, the prediction engine 116 may use a machine learning model to predict user desires to obtain products or services. The prediction engine 116 may use machine learning algorithms to generate the machine learning model. The machine learning model may be trained using anonymous historical user behavior data combined with corresponding anonymous past product or service acquisition patterns of other users. Various classification schemes (explicitly and/or implicitly trained) and/or systems may be employed by the prediction engine 116 for the generation of the machine learning model. A classifier is a function that maps an input attribute vector, $x=(x_1, x_2, x_3, x_4, \ldots x_n)$, to a confidence that the input belongs to a class, that is, $f(x)=\text{confidence(class)}$. Such classification may employ a probabilistic and/or statistical-based analysis (e.g., factoring into the analysis utilities and costs) to generate the machine learning model. A support vector machine (SVM) is an example of a classifier that may be employed by the prediction engine 116. The SVM operates by finding a hypersurface in the space of possible inputs, which hypersurface attempts to split the triggering criteria from the non-triggering events. Other directed and undirected model classification approaches include, e.g., naïve Bayes, Bayesian networks, decision trees, neural networks, fuzzy logic models, and probabilistic classification models providing different patterns of independence may also be employed. Those of skill in the art will understand that any appropriate directed or undirected model classification approach may be used.

The prediction engine 116 may further use a natural language processing (NLP) algorithm to determine user intent from the persistent data representations corresponding to the speech of the user. The NLP may use techniques such as morphological segmentation, part-of-speech tagging, word segmentation, named entity recognition (NER) to parse the language contained in a persistent data representation (e.g., text) of the speech into speech entities that include semantics, concepts, nouns, etc. The speech entities are then feed into the machine learning model of the prediction engine 116. Accordingly, the prediction engine 116 may predict that a user desires to obtain a product or a service without the user explicitly stating to the assistant application 112 a verbal desire to obtain the product or service.

In some embodiments, the prediction engine 116 may predict based on user behavior data that the user 106 desires to obtain a product or a service from a specific vendor. In such embodiments, the prediction engine 116 may determine based on biometric data whether the user 106 is authorized to obtain the product or the service. The biometric data may include the voice print of the user 106, a fingerprint of the user 106, a facial image or partial facial image of the user 106, etc. The user 106 may have previously notified the prediction engine 116 that only the user 106 is authorized to initiate obtaining products or services from a user device of the user. Accordingly, the prediction engine 116 may activate a particular user device of the user to obtain biometric data (e.g., activate a camera of the user device to obtain a facial image or a partial facial image). For example, the user device may be a particular user device that is determined by the prediction engine 116 to be currently used by the user.

The prediction engine 116 may make this determination because the user device is currently receiving user behavior data input (e.g., speech, application input, and/or sensor input) from the user, or was the last user device to have received user behavior data input from the user, as indicated by the associated time and date information of the data. Thus, when the biometric data obtained by the user device (e.g., facial image or partial facial image) matches biometric data of the user 106 (e.g., facial image or partial facial image of the user 106) stored by the prediction engine 116, the engine may determine that the desire for a product or service is from the authorized user 106. Alternatively, the prediction engine 116 may compare the previously collected biometric data (e.g., voice print of the speech that expressed the desire for a product or service) to stored biometric data (e.g., voice print of the user 106). Thus, if the previously collected biometric data matches the stored biometric data, the prediction engine 116 may determine that the desire for a product or service is from the authorized user 106.

Following a verification that the desire to obtain a product or service is from an authorized user, the prediction engine 116 may trigger the assistant application 112 on the user device to prompt the user 106 to provide a confirmation to proceed with obtaining the specific product or service from the specific vendor. The prompt may be in the form of a visual message that is presented on a display of the user device and/or an audio message that is played back via a speaker of the user device. The prompt may indicate a cost for obtaining the product or service from the specific vendor. In turn, the user may key in or speak the confirmation to the assistant application 112 of the user device. Alternatively, the user may use any other appropriate action to indicate confirmation, such as a gesture, a facial impression, etc. Once the confirmation is signaled by the assistant application 112 to the prediction engine 116, the engine may proceed with ordering the product or service for the user 106 from the specific vendor.

For example, the user behavior data of the user 106 may include a conversation that the user 106 is having with a spouse, in which the user 106 asks, "do we have enough cereal for next week?" and the spouse replies "no". Accordingly, the prediction engine 116 may determine from the context of the conversation that the user 106 may want to buy more cereal. The prediction engine 116 may have knowledge from additional contextual information (e.g., a purchase pattern of the user 106) that the user likes to buy cereal from a particular online merchant. Accordingly, the prediction engine 116 may prompt the user 106 to confirm that the user 106 wants to purchase cereal from the particular online merchant, and proceed with the purchase once the user has provided the confirmation. Accordingly, such an example illustrates the ability of the prediction engine 116 to use user behavior data in the form of conversations of the user with other persons to predict the intent of the user.

In some embodiments, the prediction engine 116 may handle a payment by the user to the specific vendor for the product or service. In such embodiments, the prediction engine 116 may use a billing function, e.g., an Online Charging System (OCS) of the wireless carrier network 102 to charge the user the fee for the product or service. In turn, the billing function may remit the payment to the specific vendor. In some instances, the total payment that is charged by the billing function may include the cost of the product or service, and a predetermined fee or a percentage of the cost that is charged by the wireless carrier network 102 for facilitating the transaction for the product or service.

In another example, the user behavior data of the user 106 may include the user 106 recording a reminder in a notation application on the user device 104(1) to fill up on gas for a vehicle of the user 106 at the end of the day. The prediction engine 116 may have knowledge from additional contextual information (e.g., a purchase pattern of the user 106) that the user 106 likes to obtain gas from the most inexpensive gas station in a geographical area. Accordingly, the prediction engine 116 may automatically search for a gas station that currently has the most inexpensive gas in the geographical area. Following a confirmation from the user, the prediction engine 116 may direct an assistant application 112 on the user device 104(M) of the vehicle 110 to add a stopover destination to a navigation application installed in the user device 104(M). The stopover destination is for the gas station with the most inexpensive gas and is added to the afternoon commute of the user 106. Thus, such an example illustrates the ability of the prediction engine 116 to use a cost contextual parameter to automatically select a vendor to provide a product or service to a user, as well as the ability of the prediction engine 116 to schedule a future delivery of a product or service to the user. Other parameters that the prediction engine 116 may use to automatically select a vendor to provide a product or a service may include reputations of the vendors, qualifications of the vendors, capabilities of the vendors, proximity to the location of the user and/or his or her vehicle, and/or so forth.

In other embodiments, the prediction engine 116 may determine based on user behavior data that the user 106 desires to obtain a product or a service without specifying a particular vendor. Accordingly, prediction engine 116 may ascertain that the user 106 is authorized to obtain the product or the service based on biometric data, and that the user 106 has confirmed to proceed with the purchase of the product or the service. In such embodiments, the prediction engine 116 may formulate a request 118 for the product or service and transmit the request 118 to a matching platform 120 that is implemented via one or more computing nodes 122. The matching platform 120 may be operated by the wireless carrier network 102 or operated by a third-party on behalf of the wireless carrier network 102. The request 118 may include the specifications for the product or service that is wanted by the user 106. In turn, the matching platform 120 may broadcast the request 118 to vendors that have registered with the matching platform 120 to solicit bids. In scenarios in which the request 118 is for a service, the matching platform 120 may solicit bids 124(1)-124(K) from service providers 126(1)-126(K). Subsequently, several of the service providers 126(1)-126(K) may provide bids for performing the service. In some embodiments, the requested service may be a service that is performed by a machine. For example, the service may be to analyze data from multiple databases to generate an analytical report regarding a business for the user 106. In such embodiments, the bids may be automatic bids that are submitted by the analytic engines of the service providers without human intervention. An automatic bid may quote a cost for performing the service, in which the cost is calculated by a corresponding analytic engine based on multiple factors. Such factors may include the cost of obtaining the data, the cost of computationally processing the data, the cost of delivery of the results, and/or so forth.

In other embodiments, the requested service may be a service that is performed by a human service provider. For example, the requested service may be to pick up the user 106 from a first location and deliver the user 106 by vehicle to a second location. In such embodiments, the bids may be placed by service providers who are individual human vehicle operators. A bid placed by a human vehicle operator may include a price that the human vehicle operator inputs for performing the service. In various embodiments, a bid that is submitted by a service provider may further include information regarding the corresponding service provider, such as the name of the service provider, reviews and ratings of the service provider, location of the service provider, contact information for the service provider, etc. Such bids are sent by the matching platform 120 via the wireless carrier network 102, or any other appropriate connection, to the assistant application 112 for presentation to the user 106. In turn, the user 106 may use the assistant application 112 to hire a specific service provider to perform the requested service (e.g., service provider 126(1)). For example, the user 106 may select the specific service provider based on the price for the service, the reputation of the service provider, the timeliness of the service performance, the location of the service provider, and/or so forth. Following the selection, the service provider (e.g., service provider 126(1)) may provide the service to the user 106.

However, if the request 118 is for a product, the matching platform 120 may solicit bids 128(1)-128(J) for the product provider 130(1)-130(J). Subsequently, several of the product providers 130(1)-130(J) that are online merchants may provide the bids 128(1)-128(J) for providing the product to the user 106. A bid may include information regarding the offered product, such as the cost for the product, delivery date and time for the product, cost of the delivery, warranty and service information for the product, etc. A bid may further include information regarding the corresponding product provider, such as the name of the product provider, the reviews and ratings of the product provider, the address of the product provider, the contact information for the product provider, etc. Such bids are sent by the matching platform 120 to the assistant application 112 for presentation to the user 106. In turn, the user 106 may use the assistant application 112 to purchase the product from a specific product provider (e.g., product provider 130(1)). For example, the user 106 may select the specific product provider based on the cost for the product, the reputation of the product provider, the timeliness of the product delivery, the location of the product provider in proximity to the user 106, and/or so forth. Following the selection, the product may be delivered by the specific product provider (e.g., product provider 130(1)) to the user 106.

Example User Device Components

Figure 2:
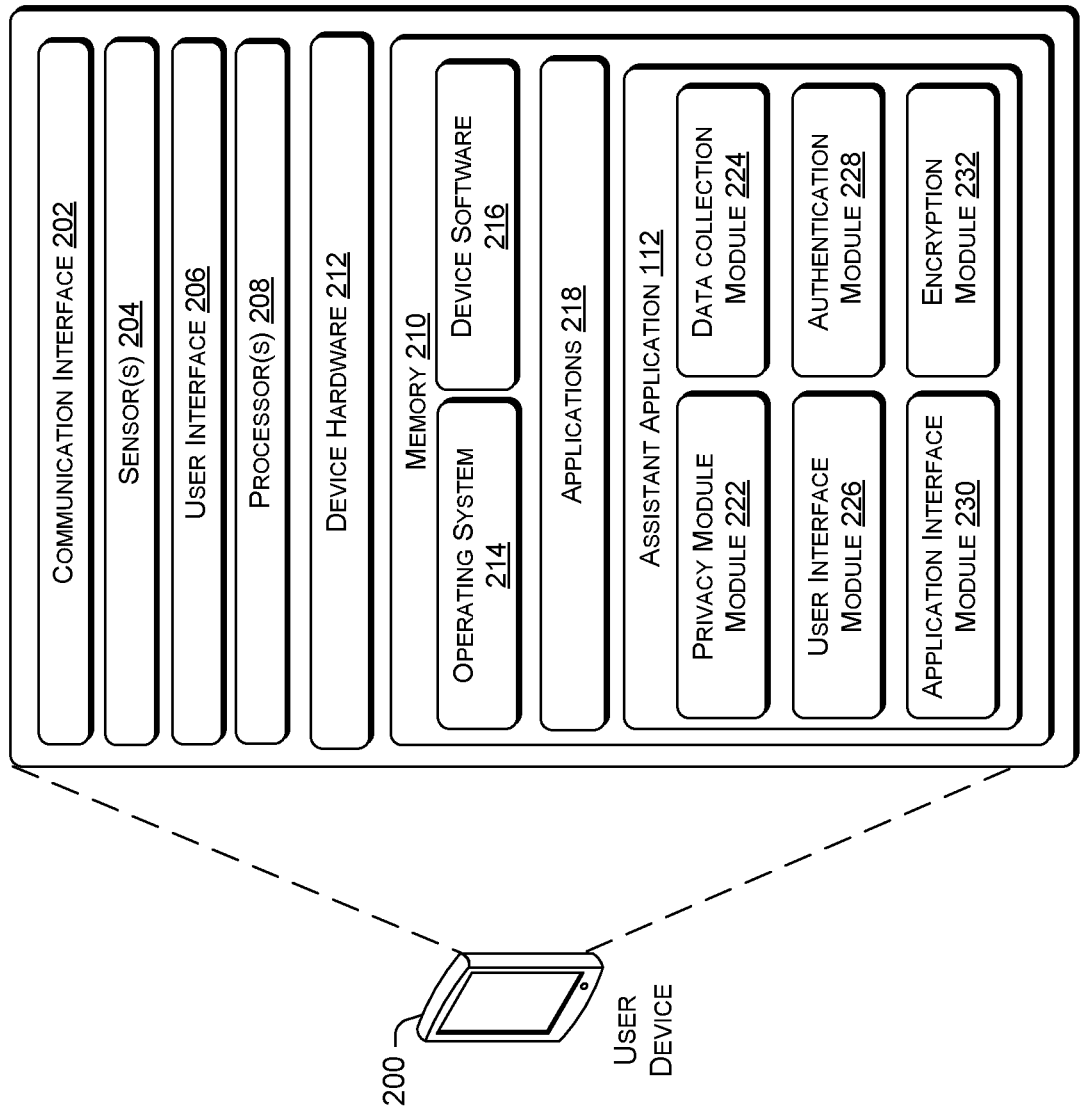
FIG. 2 is a block diagram showing various components of a user device that collects user behavior data of a user for the purpose of predictively offering products and services to the user.

FIG. 2 is a block diagram showing various components of a user device that collects user behavior data of a user for the purpose of predictively offering products and services to the user. The user device 200 may include a communication interface 202, one or more sensors 204, a user interface 206, one or more processors 208, memory 210, and device hardware 212. The communication interface 202 may include wireless and/or wired communication components that enable the electronic device to transmit or receive voice or data communication via the wireless carrier network 102, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect movement of objects that are proximate the user device 200. The compass, the accelerometer, and the GPS sensor may detect orientation, movement, and geolocation of the user device 200. The cameras may capture images of the environment around the user device 200.

The user interface 206 may enable a user to provide inputs and receive outputs from the user device 200. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 212 may include a modem that enables the user device 200 to perform telecommunication and data communication with the wireless carrier network 102. The device hardware 212 may further include signal converters, antennas, hardware decoders and encoders, graphic processors, a universal integrated circuit card (UICC) or an embedded UICC (eUICC), and/or the like that enable the user device 200 to execute applications and provide telecommunication and data communication functions.

The one or more processors 208 and the memory 210 of the user device 200 may implement an operating system 214, device software 216, one or more applications 218, and the assistant application 112. Such software may include routines, program instructions, objects, and/or data structures that are executed by the processors 208 to perform particular tasks or implement particular abstract data types.

The operating system 214 may include components that enable the user device 200 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, or a bootloader that boots up the user device 200 and executes the operating system 214 following power up of the device.

The applications 218 may include applications that provide utility, entertainment, and/or productivity functionalities to a user of the user device 200. For example, the applications 218 may include telephony applications, electronic mail applications, remote desktop applications, web browser applications, navigation applications, office productivity applications, multimedia streaming applications, an online shopping application, and/or so forth.

The assistant application 112 may include a privacy module 222, a data collection module 224, a user interface module 226, an authentication module 228, an application interface module 230, and an encryption module 232. The privacy module 222 may provide a user interface that enables the user 106 to select or unselect the type of user behavior data that may be collected by the data collection module 224. For example, the user interface may provide a list of user behavior data that are potentially accessible to the assistant application 112. The list may include different types of user behavior data, such as speech data, application input data, sensor data, etc. The list may include checkboxes that allow a user to designate specific types of user behavior data that may be collected by the data collection module 224. Conversely, the user 106 may use the list to disable some or all types of data collection by the data collection module 224. The privacy module 222 may configure the data collection module 224 to collect or not collect different types of user behavior data based on the selections of the user 106. In this way, the privacy of the user 106 may be protected by the privacy module 222.

The data collection module 224 may collect user behavior data of the user 106 from multiple sources. These sources may include the sensors 204 (e.g., a fingerprint reader), the user interface 206 (e.g., a microphone, a keyboard, etc.), and applications 218 that execute on the user device 200. In some embodiments, the data collection module 224 may use a speech-to-text engine to convert the speech picked up by the microphone or a telephony application of the user device 200 into persistent data representations for transfer to the prediction engine 116. The data collection module 224 may use application program interfaces (APIs) or software hook components to intercept the user inputs and application events that are captured or generated by the sensors 204 and the applications 218. The user inputs and application events are then coded by the data collection module 224 into persistent data representations for transfer to the prediction engine 116.

The user interface module 226 may enable the assistant application 112 to interact with the user 106. In various embodiments, the user interface module 226 may present visual, audio, and/or haptic messages via the user interface 206 of the user device 200. The user interface module 226 may present these messages under the direction of the prediction engine 116. The messages may include prompts for the user 106 to confirm that the user 106 intends to obtain a product or service, a list of bids from prospective product providers or service providers for providing products or services to the user, error messages regarding malfunctions of the assistant application 112, notifications regarding the delivery of specific products or services, information regarding links or storage locations for retrieving data that are generated as a part of provided services, and/or so forth. The user 106 may input data into the user interface module 226 via the user interface 206. Thus, the user 106 may use the user interface module 226 to confirm that the user 106 desires to obtain the specific product or service, retrieve information, select a bid to obtain a product or service, and/or so forth.

The authentication module 228 may be activated by the prediction engine 116 to use biometric data to verify the identity of the user 106 prior to initiating a delivery or bidding for the delivery of a product or service. The biometric data of an authorized user (e.g., user 106) may be stored in a secure data storage of the user device 200. The biometric data may include a voiceprint, a facial image or partial facial image, a fingerprint, a retinal or iris pattern, etc. In some instances, the authentication module 228 may be prompted by the prediction engine 116 to use a microphone of the user device 200 to captured speech of a user who expressed a desire for a product or service. The voiceprint from the captured speech of the user is then compared to a stored voiceprint of an authorized user (e.g., user 106) to determine whether the user is an authorized user. In other instances, the authentication module 228 may activate a camera of the user device 200 to capture a facial image or a partial facial image of the user. The captured facial image or partial facial image is then compared by the authentication module 228 to the stored facial image or partial facial of an authorized user to determine whether the user is an authorized user. In an additional instance, the authentication module 228 may activate a fingerprint sensor of the user device 200 to capture a fingerprint of the user. The captured fingerprint is then compared by the authentication module 228 to the stored fingerprint of an authorized user to determine whether the user is an authorized user. The authentication module 228 may be activated to perform the verification prior to or following the prediction engine 116 have confirmed that a user desires to obtain a product or service.

The application interface module 230 may interface with the applications 218 that are installed on the user device 200 under the direction of the prediction engine 116. In some instances, the assistant application 112 may be directed to add an appointment to a calendar application so that the user 106 may obtain a product or service at a specific date and time. In other instances, the assistant application 112 may be directed to add a destination to a navigation application so that the user 106 may obtain a product or service at a particular location. In additional instances, the assistant application 112 may be directed to send data that is generated as a part of a provided product or service to an email application, an office productivity application, a messaging application, and/or so forth. For example, the assistant application 112 may automatically email an analytic report that is generated for the user 106 by a service provider to an email account of the user 106 or an email recipient designated by the user 106.

The encryption module 232 may encrypt outgoing data and decrypted incoming data using various encryption schemes. For example, the encryption may be implemented using various asymmetric and symmetric encryption techniques such as public key infrastructure (PKI) key negotiation and encryption, Diffie-Hellman key exchange, and/or so forth. In some instances, the encryption module 232 may also implement hash-based techniques to specify and verify the authenticity of the data that are exchanged between the entities. For example, the hash-based techniques may include the use of MD5 hashing, SHA-1 hashing, and/or so forth, to generate keyed-hash message authentication codes (HMAC). The prediction engine 116 may have a similar encryption module for encrypting and decrypting data. Accordingly, data communication exchanged between the user device 200 and the prediction engine 116 may be protected.

Example Computing Node Components

Figure 3:
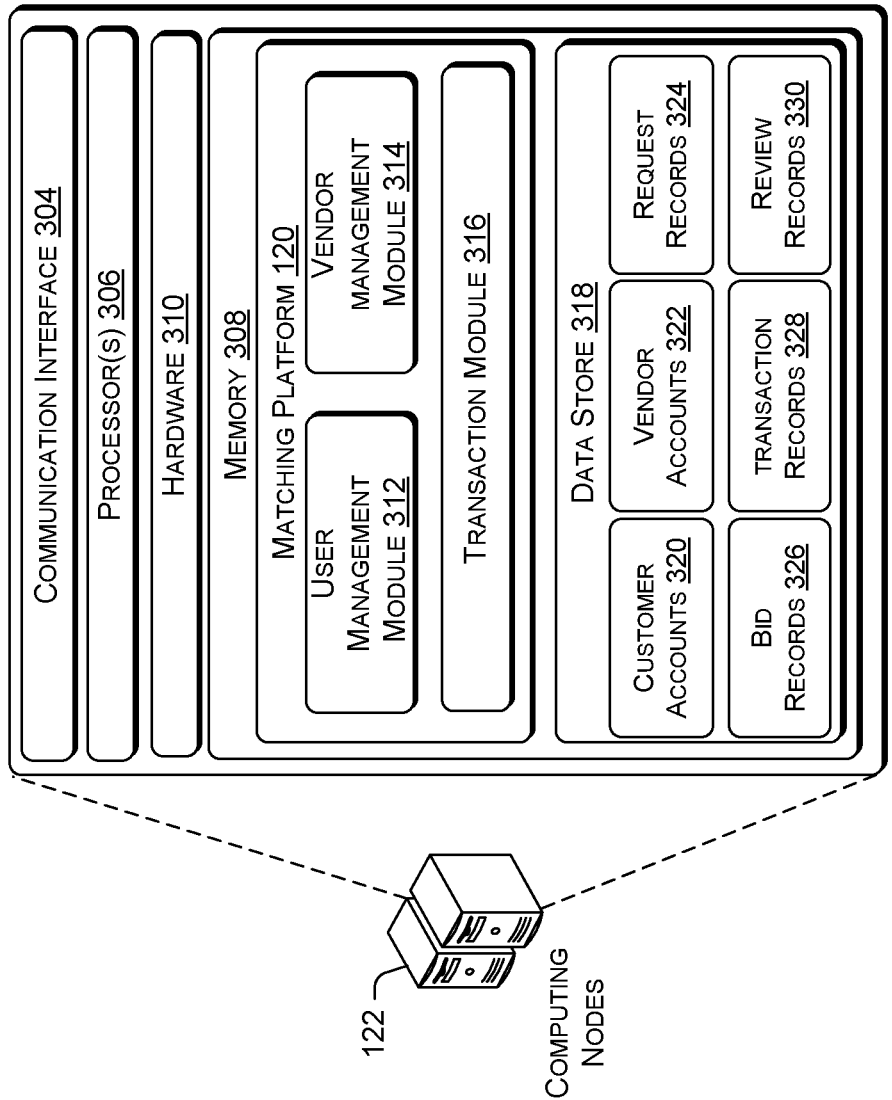
FIG. 3 is a block diagram showing various components of one or more illustrative computing nodes that enable multiple product and service providers to predictively offer product and services to a user based on user behavior.

FIG. 3 is a block diagram showing various components of one or more illustrative computing nodes that enable multiple product and service providers to predictively offer products and services to a user based on user behavior. The matching platform 120 may be implemented by the computing nodes 122. The computing nodes 122 may include a communication interface 304, one or more processors 306, and memory 308. The communication interface 304 may include wireless and/or wired communication components that enable the one or more computing nodes 122 to transmit data to and receive data from other networked devices. The computing nodes 122 may be accessed via hardware 310. The hardware 310 may include additional user interface, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The matching platform 120 may be stored in the memory 308. The matching platform 120 may include a user management module 312, a vendor management module 314, and a transaction module 316. The modules may include routines, program instructions, objects, and/or data structures that perform particular tasks or implement particular abstract data types. The memory 308 may be further configured to implement a data store 318.

The user management module 312 may enable users, such as the user 106, to create customer accounts 320. For example, the user 106 may establish a corresponding customer account by providing registration information to the user management module 312 via a user device, such as the user device 104(1). The registration information may include a customer name, a customer address, customer contact information, a login name, a password, and/or so forth. Each of the customer accounts 320 may also include account access information for one or more financial accounts that a corresponding consumer provided for paying transactions and receiving refunds. In some instances, the customer accounts 320 may be used by the wireless carrier network 102 to charge users periodic recurring fees for the use of the assistant application 112. In alternative embodiments, the user management module 312 may interface with a billing function of the wireless carrier network 102 to charge a user account of a user a periodic recurring fee for the use of the assistant application 112. The customer accounts 320 may enable the users to use the matching platform 120 to pay vendors for products and services.

The vendor management module 314 may be responsible for managing vendor access to the matching platform 120. Accordingly, the vendor management module 314 may enable vendors to create vendor accounts 322. A vendor, such as a service provider or a product provider, may establish a corresponding vendor account by providing registration information to the vendor management module 314 via a user device. The registration information may include a vendor name, a business name, a business address, business contact information, a login name, a password, and/or so forth. A vendor account may enable a vendor to provide bids that offer products or services to the matching platform 120. Further, a vendor account may also enable a vendor to receive payments from users via the matching platform 120.

The transaction module 316 may receive a user-initiated request, such as the request 118, for a product or service from the prediction engine 116. In turn, the transaction module 316 may solicit bids from the vendors for offering a product or service that meets the request. A bid that is submitted by a vendor may include a fee that the vendor charges for the product or service, information regarding the nature of the product or service, information regarding a date and time for the performance of the service or the delivery of the product, payment terms, and/or so forth. The bid may further include information regarding the corresponding vendor, such as the name of the vendor, the reviews and ratings of the vendor, the location of the vendor, the contact information for the vendor, and/or so forth.

In turn, the transaction module 316 may use the wireless carrier network 102 to send the bids to the assistant application 112 on a user device of the user. Thus, the bids may be presented to the user by the user device. In response, the user may use the assistant application 112 to select one of the bids that is presented. Once the user authorizes payment for the product or service that is the subject of the bid, the transaction module 316 may obtain payment for the purchase of the product or service from a financial account of the user. A financial account may be a checking account, a savings account, a debit card account, a credit card account, a charge card account, a gift card account, and/or the like. The payment for the bid is then communicated by the assistant application 112 to the transaction module 316. In turn, the transaction module 316 may transfer the payment from the financial account of the user to an account of the vendor associated with the selected bid, and notify the vendor to fulfill the product or service order.

In various embodiments, the transaction module 316 may charge a vendor various fees for the ability to sell products or services to the users of the wireless carrier network 102. In some instances, the transaction module 316 may charge a vendor a periodic fee (e.g., a monthly fee) for access to the matching platform 120. In other instances, the transaction module 316 may charge the vendor a flat fee or a percentage fee for each product or service that is sold through the matching platform 120. In such instances, the transaction module 316 may deduct the fee from a financial account of the vendor.

In some embodiments, the transaction module 316 may provide interactive review interfaces for users to rate vendors and vice versa. For example, users may rate vendors on areas such as delivery speed, quality of the delivered product, promptness and reliability of communication, and/or so forth. In turn, the vendors may rate the end users on areas such as promptness and reliability of communication, promptness of payment, and/or so forth. The ratings provided to the transaction module 316 may be on a numerical scale. For example, the numerical scale may be a star rating scale (e.g., four out of five stars), a points system (e.g., 90 out of 100 points), a recommendation percentage scale (e.g., recommended by 80% of the users), etc. The transaction module 316 may display the ratings of the users and/or vendors during a bidding process.

The data store 318 may store the data that is received and processed by the various modules of the matching platform 120. The data store 318 may include one or more databases, such as relational databases, object databases, object-relational databases, and/or key-value databases. The data stored in the data store 318 may include the customer accounts 320, the vendor accounts 322, request records 324 of requests that are handled by the matching platform 120, bid records 326 of bids that are submitted by the vendors, transaction records 328 of the product and/or service transactions, and review records 330 of the various reviews that are submitted by users and vendors.

In various embodiments, the matching platform 120 may use blockchain technology to implement the data store 318 in a distributed and immutable manner. Blockchain technology refers to the use of a blockchain, or a continuously growing list of linked records, i.e., blocks, to store data. The linked records may be secured using cryptography such that each block contains a hash pointer that links the block to a previous block. Each block is configured to store a record and associated metadata, such as a timestamp, an identifier of the record, a type of the record, and/or so forth. Further, each block in the blockchain may be stored and managed by peer-to-peer network computing nodes that use a block validation protocol. This means that it is not possible to retroactively alter the record stored in any particular block of the blockchain without altering all subsequent blocks with the cooperation of a majority of the network peers in the peer-to-peer network. Accordingly, blockchain technology provides a decentralized secure data storage for storing records of the matching platform 120 in a verifiable and permanent manner.

Example Processes

Figure 4:
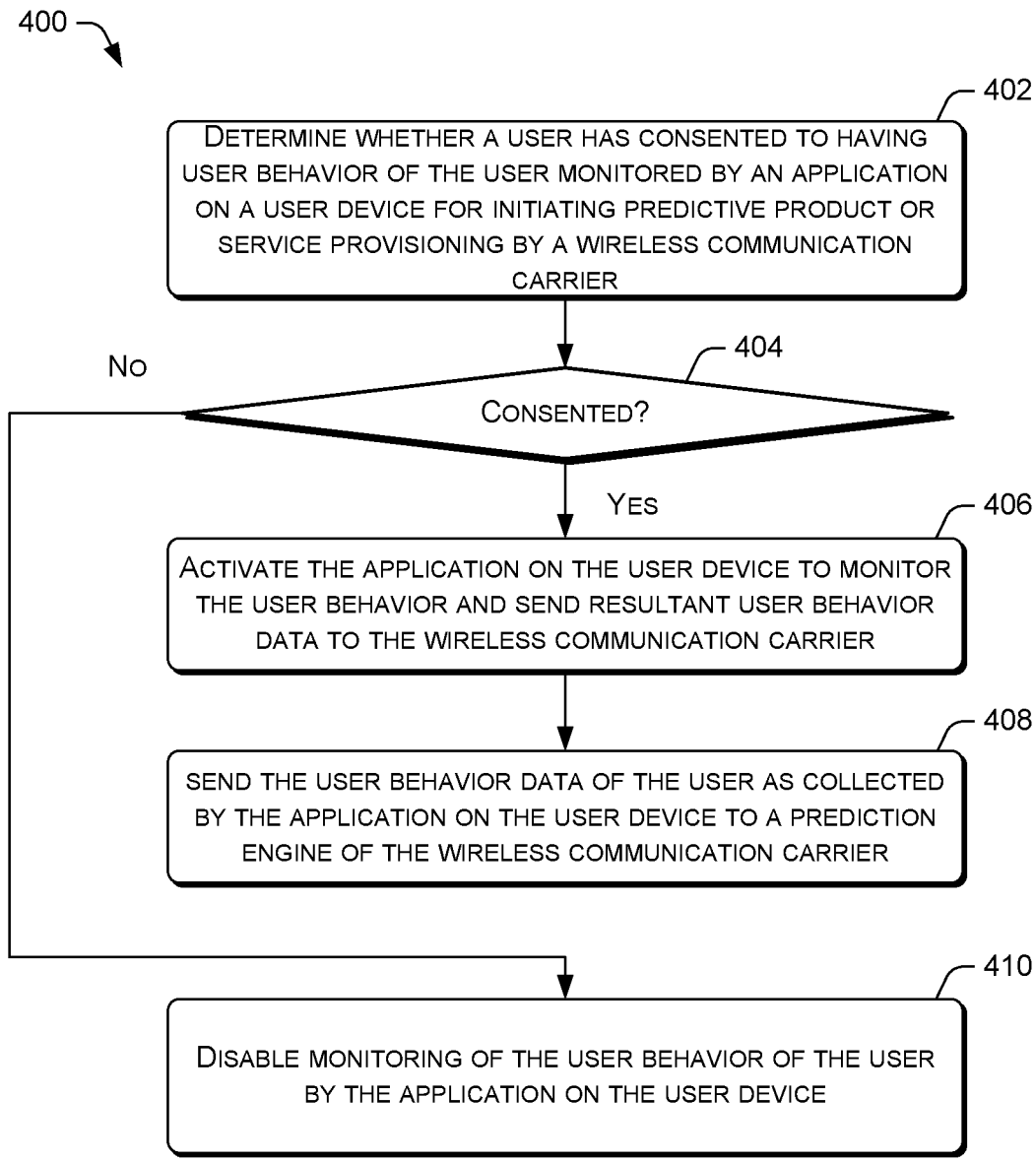
FIG. 4 is a flow diagram of an example process for collecting user behavior data of a user via a user device for initiating predictive product or service provisioning.
Figure 5:
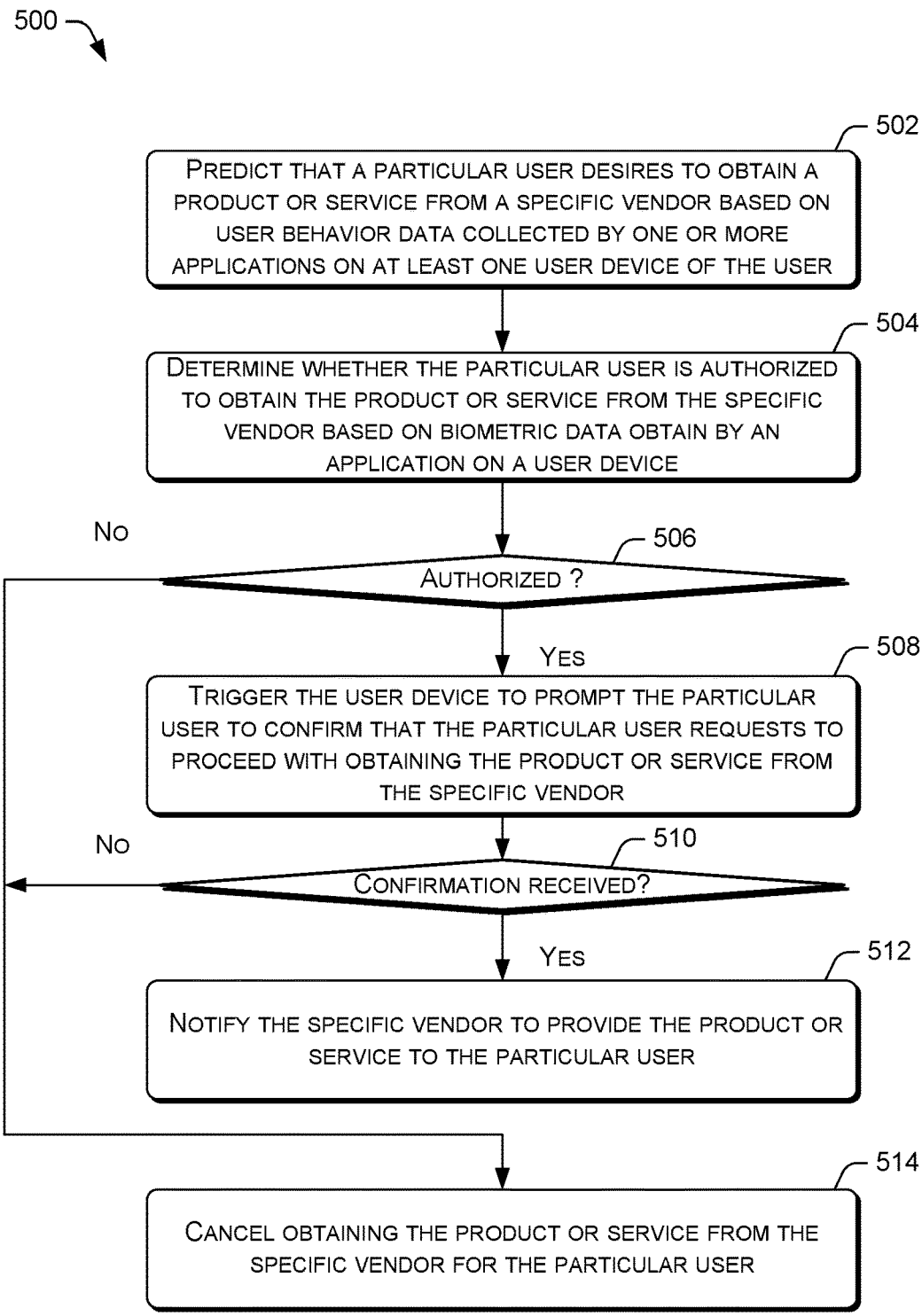
FIG. 5 is a flow diagram of an example process for predictively offering a product or a service from a specific vendor to a user based on collected user behavior data.
Figure 6:
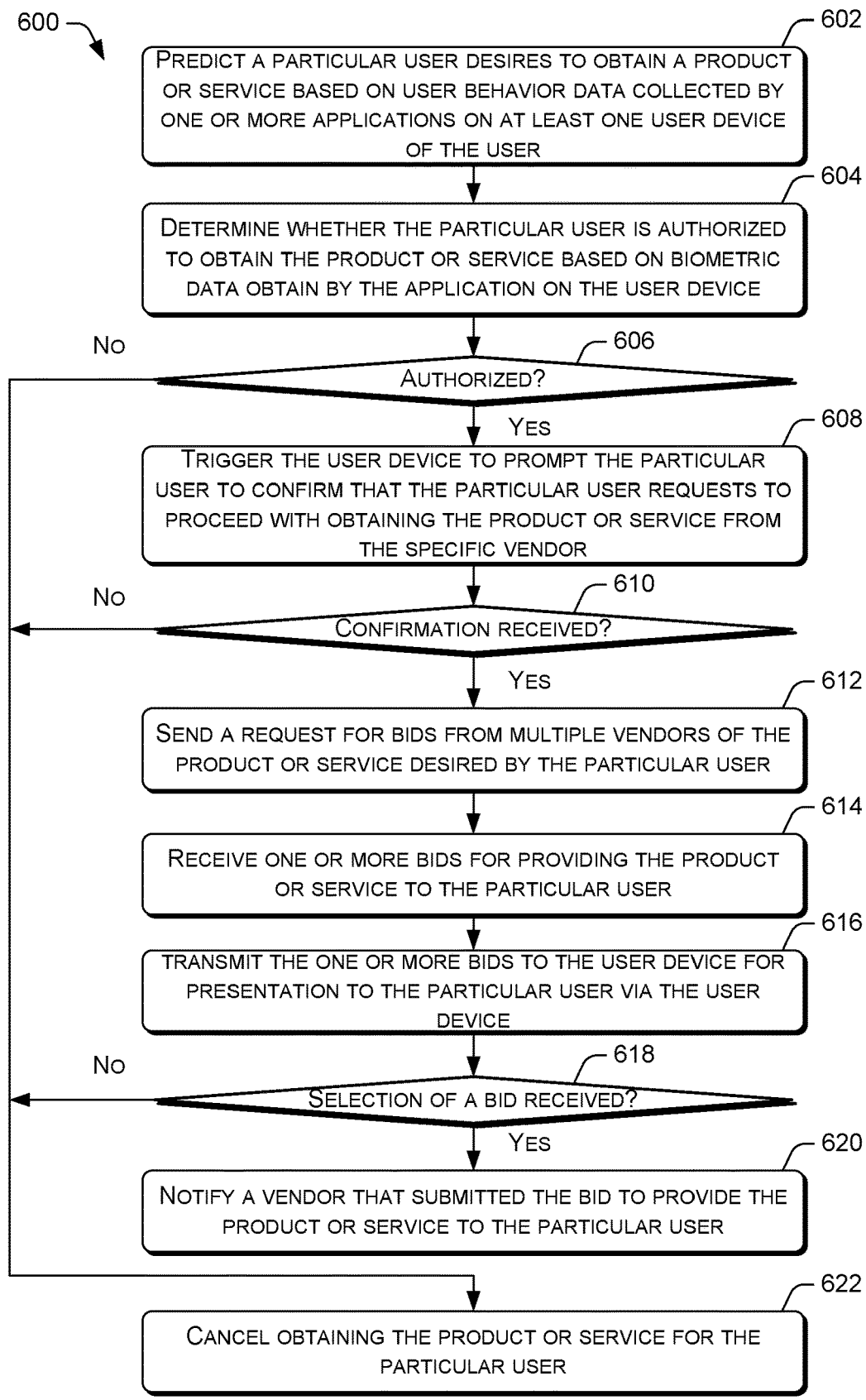
FIG. 6 is a flow diagram of an example process for multiple vendors to competitively provide a product or a service to a user that is predicted to be desired by the user based on collected user behavior data.

FIGS. 4-6 present illustrative processes 400-600 that may be implemented by a wireless carrier network to use user behavior data of a user as collected by user devices of the user to predictively offer products and services to the user. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an example process 400 for collecting user behavior data of a user via a user device for initiating predictive product or service provisioning. At block 402, the assistant application 112 on a user device may determine whether a user has consented to having user behavior of the user monitored by the application. In various embodiments, the assistant application 112 may make the determination of user consent based on user consent selection that is inputted by the user. For example, the assistant application 112 may provide a user interface that enables the user to select whether to activate or disable user behavior data selection, as well as select the specific types of user behavior data that the application may collect if the user consents to some form of user behavior data collection. Accordingly, the user behavior that the user has consented to being monitored may be user behavior belonging to a subset of user behavior types. For example, the user may have consented to the monitoring of speech data but not geolocation data.

At decision block 404, if the assistant application 112 determines that the user has consented ("yes" at decision block 404), the process 400 may proceed to block 406. At block 406, the assistant application 112 may activate on the user device to monitor the user behavior of the user and send the resultant user behavior data to the prediction engine 116 of the wireless communication carrier. In various embodiments, the user behavior data may include verbal communication that is picked up by a microphone or a telephony application of the user device, user application inputs, and/or sensor data provided by the sensors of the user device.

At block 408, the assistant application 112 may send the user behavior data of the user to the prediction engine 116 of the wireless carrier network 102. In various embodiments, the prediction engine 116 may use machine learning to analyze the user behavior data that is received from the assistant application 112 to predict whether a user desires to have a product or a service provided. In some embodiments, the prediction engine 116 may receive user behavior data that is sent by instances of the assistant application 112 on multiple user devices, such as a smartphone of the user, a home smart device of the user, and/or a vehicle smart device of the user.

Returning to decision block 404, if the assistant application 112 determines that the user has not consented ("no" at decision block 404), the process 400 may proceed to block 410. At block 410, the assistant application 112 may disable the monitoring of the user behavior of the user.

FIG. 5 is a flow diagram of an example process 500 for predictively offering a product or a service from a specific vendor to a user based on collected user behavior data. At block 502, the prediction engine 116 may predict that a particular user desires to obtain a product or service from a specific vendor based on user behavior data collected by one or more assistant applications on at least one user device of the user. In various embodiments, each of the one or more assistant applications may be a copy of the assistant application 112. Further, the user devices may include a smartphone of the user, a home smart device of the user, and/or a vehicle smart device of the user, among other appropriate devices. The prediction engine 116 may make the determination using a machine learning algorithm that predicts user desire for a product or service by using a machine learning model to analyze the user behavior data.

At block 504, the prediction engine 116 may determine whether the particular user is authorized to obtain the product or service from the specific vendor based on biometric data obtained by an assistant application 112 on a user device. In various embodiments, the user device may be a particular user device that is determined by the prediction engine 116 to be currently used by the user. The prediction engine 116 may make this determination because the user device is currently receiving user behavior data input (e.g., speech, application input, and/or sensor input) from the particular user, or was the last user device to have received user behavior data input from the particular user, as indicated by the associated time and date information of the user behavior data. For example, the biometric data may include a voiceprint, a facial image, a fingerprint, a retinal or iris pattern, and/or so forth. Accordingly, the prediction engine 116 may trigger the assistant application 112 on a particular user device to obtain biometric data of the particular user that is using the user device, and compare the biometric data to biometric data of an authorized user that is stored in a memory of the user device. Thus, the assistant application 112 may determine that the particular user is authorized to obtain a product or service when the biometric data of the particular user matches the stored biometric data of the authorized user. Otherwise, the assistant application 112 may determine that the particular user is not authorized to obtain the product or service. Subsequently, the user device may report the authorization status of the particular user to the prediction engine 116.

Thus, at decision block 506, if the prediction engine 116 determines that the particular user is authorized ("yes" at decision block 506), the process 500 may proceed to block 508. At block 508, the prediction engine 116 may trigger the user device to prompt the user to confirm that the user requests to proceed with obtaining the product or service from the specific vendor. In various embodiments, the prompt may be in the form of a visual message that is presented on a display of the user device, an audio message that is played back via a speaker of the user device, or some other form of prompt notification, such as haptic feedback. In turn, the user may key in, speak, or otherwise input the confirmation to the assistant application 112 of the user device. Alternatively, if the user does not want to obtain the product or service, the user may key in, speak, or otherwise input a denial of the request to the assistant application 112. The confirmation or denial is communicated by the assistant application 112 to the prediction engine 116.

At decision block 510, if the prediction engine 116 receives a confirmation that the user requests to obtain the product or service ("yes" at decision block 510), the process 500 may proceed to block 512. At block 512, the prediction engine 116 may notify the specific vendor to provide the product or service to the user. For example, the specific vendor may generate an analytical report for the user or provide a product to the user. In some embodiments, the prediction engine 116 may use a billing function of the wireless carrier network 102 to charge the user a fee for the product or service. In turn, the billing function may remit the payment to the specific vendor. In some instances, the total payment that is charged by the billing function may include the cost of the product or service charged by the specific vendor and a predetermined fee or a percentage of the cost that is charged by the wireless carrier network 102 for facilitating the transaction for the product or service. In alternative embodiments, the prediction engine 116 may instead use the assistant application 112 to notify the user to obtain the product or service from the specific vendor. The prediction engine 116 may charge the specific vendor a predetermined fee for such a service. For example, the assistant application 112 may be directed by the prediction engine 116 to add an appointment to a calendar application so that the user may obtain the product or service at a particular date and time from the specific vendor. In other instances, the assistant application 112 may be directed to add a destination to a navigation application so that the user may obtain the product or service at a particular location of the specific vendor.

Returning to decision block 506, if the prediction engine 116 determines that the particular user is not authorized ("no" at decision block 506), the process 500 may proceed to block 514. At block 514, the prediction engine 116 may cancel obtaining the product or service from the specific vendor for the user. Likewise, returning to decision block 510, if the prediction engine 116 receives a denial of the request to obtain the product or service by the user ("no" at decision block 510), the process 500 may proceed directly to block 514.

FIG. 6 is a flow diagram of an example process 600 for multiple vendors to provide a product or a service to a user that is predicted to be desired by the user based on collected user behavior data. At block 602, the prediction engine 116 may predict that a particular user desires to obtain a product or service based on user behavior data collected by one or more assistant applications on at least one user device of the user. In various embodiments, each of the one or more assistant applications may be a copy of the assistant application 112. Further, the user devices may include a smartphone of the user, a home smart device of the user, and/or a vehicle smart device of the user. The prediction engine 116 may make the determination using a machine learning algorithm that predicts user desire for a product or service by using a machine learning model to analyze the user behavior data.

At block 604, the prediction engine 116 may determine whether the particular user is authorized to obtain the product or service based on biometric data obtained by an assistant application 112 on a user device. In various embodiments, the user device may be a particular user device that is determined by the prediction engine 116 to be currently used by the user. The prediction engine 116 may make this determination because the user device is currently receiving user behavior data input (e.g., speech, application input, and/or sensor input) from the particular user, or was the last user device to have received user behavior data input from the particular user, as indicated by the associated time and date information of the user behavior data. For example, the biometric data may include a voiceprint, a facial image, a fingerprint, a retinal or iris pattern, and/or so forth. Accordingly, the prediction engine 116 may trigger the assistant application 112 on a particular user device to obtain biometric data of the particular user that is using the user device and compare the biometric data to biometric data of an authorized user that is stored in a memory of the user device. Thus, the assistant application 112 may determine that the particular user is authorized to obtain a product or service when the biometric data of the particular user matches the stored biometric data of the authorized user. Otherwise, the assistant application 112 may determine that the particular user is not authorized to obtain the product or service. Subsequently, the user device may report the authorization status of the particular user to the prediction engine 116.

Thus, at decision block 606, if the prediction engine 116 determines that the particular user is authorized ("yes" at decision block 606), the process 600 may proceed to block 608. At block 608, the prediction engine 116 may trigger the user device to prompt the user to confirm that the user requests to proceed with obtaining the product or service from the specific vendor. In various embodiments, the prompt may be in the form of a visual message that is presented on a display of the user device and/or an audio message that is played back via a speaker of the user device. In turn, the user may key in or speak the confirmation to the assistant application 112 of the user device. Alternatively, if the user does not want to obtain the product or service, the user may key in or speak a denial of the request to the assistant application 112. The confirmation or denial is communicated by the assistant application 112 to the prediction engine 116.

At decision block 610, if the prediction engine 116 receives a confirmation that the user requests to obtain the product or service ("yes" at decision block 610), the process 600 may proceed to block 612. At block 612, the prediction engine 116 may send a request for bids from multiple vendors of the product or service desired by the user. In various embodiments, the prediction engine 116 may formulate a request 118 for the product or service and transmit the request 118 to a matching platform 120. The request 118 may include the specifications for the product or service that is wanted by the user 106. In turn, the matching platform 120 may broadcast the request 118 to vendors that have registered with the matching platform 120 to solicit bids.

At block 614, the matching platform 120 may receive one or more bids for providing the product or service to the particular user. In some embodiments, a bid may be an automatic bid that is submitted by a machine of a vendor without human intervention, or a bid that is submitted by a human vendor. A bid may include a price for providing the product or service. Further, the bid may include information regarding the corresponding vendor, such as the name of the vendor, reviews and ratings of the vendor, the location of the vendor in proximity to the particular user, and/or so forth.

At block 616, the matching platform 120 may transmit the one or more bids to the user device for presentation to the particular user via the user device. In various embodiments, the matching platform 120 may use the wireless carrier network 102 to send the one or more bids to the assistant application 112 on the user device of the particular user. In turn, the assistant application 112 on the user device may present the one or more bids to the particular user via a user interface.

At decision block 618, the matching platform 120 may determine whether a selection of a bid of the one or more bids is received from the particular user. In various embodiments, the particular user may use the user interface provided by the assistant application 112 to select the bid. In turn, the assistant application 112 may inform the matching platform 120 of the bid selection. Thus, at decision block 618, if the matching platform 120 determines that a selection of a bid is received ("yes" at decision block 618), the process 600 may proceed to block 620. At block 620, the matching platform 120 may notify the vendor that submitted the bid to provide the product or service to the particular user. In various embodiments, the matching platform 120 may use a billing function of the wireless carrier network 102 to charge the user a fee for the product or service. In turn, the billing function may remit the payment to the specific vendor. In some instances, the total payment that is charged by the billing function may include the cost of the product or service, and a predetermined fee or a percentage of the cost that is charged by the wireless carrier network 102 for facilitating the transaction for the product or service.

Returning to decision block 606, if the prediction engine 116 determines that the particular user is not authorized ("no" at decision block 606), the process 600 may proceed to block 622. At block 622, the prediction engine 116 may cancel obtaining the product or service from the specific vendor for the user. Likewise, returning to decision block 610, if the prediction engine 116 receives a denial of the request to obtain the product or service by the user ("no" at decision block 610), the process 600 may proceed directly to block 622.

The techniques may enable a wireless communication carrier to provide additional services to its subscribers through assistant applications that are installed on user devices. The ability of an assistant application to automatically predict user desire for products or services may offer a convenient way for the user to obtain a product or a service in a timely manner without using additional time and resource to seek out vendors. Further, the matching platform may automatically match up vendors of products and services that offer the most competitive pricing to subscribers of the wireless communication carrier that desire such products or services.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving, from a user device of a particular user, data indicating that the particular user consents to collection of user behavior data, wherein the user device includes a first application that is configured to collect a type of user behavior data and a second application that is configured to collect the type of user behavior data;
   receiving, from the user device of the particular user, data indicating that the particular user is authorized to initiate obtaining products or services;
   receiving, from the user device of the particular user, (i) a portion of the user behavior data that includes the type of user behavior data, that is collected by the first application, and that includes data identifying the first application, (ii) a remaining portion of the user behavior data that includes the type of user behavior data, that is collected by the second application, and that includes data identifying the second application, and (iii) data indicating that the user device received the portion and the remaining portion of the user behavior data;
   determining that the user device was a last user device to receive the portion and the remaining portion of the user behavior data after receiving, from the user device of the particular user, the portion and the remaining portion of the user behavior data and the data indicating that the user device received the portion and the remaining portion of the user behavior data;
   based on determining that the user device was the last user device to receive the portion and the remaining portion of the user behavior data after receiving, from the user device of the particular user, the portion and the remaining portion of the user behavior data and the data indicating that the user device received the portion and the remaining portion of the user behavior data, activating a component of the user device of the particular that is configured to collect biometric data;
   receiving, from the component of the user device, the biometric data;
   determining that the particular user is interacting with the user device based on the biometric data;
   based on determining that the particular user is interacting with the user device and based on the data indicating that the particular user is authorized to initiate obtaining products or services;
   receiving anonymous historical user behavior data of other users and anonymous past product or service acquisition patterns of the other users, wherein the anonymous historical user behavior data includes data identifying a previous application that collected a corresponding portion of the anonymous historical user behavior data;
   combining the anonymous historical user behavior data of the other users and the anonymous past product or service acquisition patterns of the other users;
   training, using the combined anonymous historical user behavior data of the other users and anonymous past product or service acquisition patterns of the other users, a support vector machine that is configured to find, in a space of possible inputs, a hypersurface that splits triggering criteria from non-triggering events;
   based on the support vector machine, generating a machine learning model that is configured to receive given user behavior data of a given user and output data predicting whether the given user desires to obtain a given product or service from a given vendor, wherein the given user behavior data includes data identifying a given application that collected a corresponding portion of the given historical user behavior data;
   predicting, by providing, to the machine learning model, the user behavior data that includes (i) the portion of the user behavior data that includes the type of user behavior data, that is collected by the first application, and that includes the data identifying the first application and (ii) the remaining portion of the user behavior data that includes the type of user behavior data, that is collected by the second application, and that includes the data identifying the second application, that the particular user desires to obtain a product or a service from a specific vendor based on the portion and the remaining portion of the user behavior data;
   triggering an application on the user device to prompt the particular user to confirm that the particular user requests to proceed with obtaining the product or the service from the specific vendor;
   notifying the specific vendor to provide the product or the service to the particular user in response to receiving a confirmation from the particular user that the particular user requests to proceed with obtaining the product or the service; and
   canceling obtaining the product or the service from the specific vendor for the particular user in response to receiving a denial that the particular user desires to obtain the product or the service.

2. The one or more non-transitory computer-readable media of claim 1, wherein the acts further comprise receiving a predetermined fee or a predetermined percentage of a payment made by the particular user for the product or the service following the specific vendor providing the product or the service to the particular user.

3. The one or more non-transitory computer-readable media of claim 1, wherein the portion and the remaining portion of the user behavior data further includes at least one of user application inputs of the user to one or more applications on the user device or sensor data provided by one or more sensors of the user device.

4. The one or more non-transitory computer-readable media of claim 3, wherein the sensor data includes at least one of Global Positioning System (GPS) geolocation data, camera image data, video data, compass reading data, or accelerometer data.

5. The one or more non-transitory computer-readable media of claim 1, wherein the service includes an automated service provided by a machine or a service that is provided by a human service provider.

6. The one or more non-transitory computer-readable media of claim 1, wherein:
the user device receives telecommunication services from a wireless carrier network, and
the machine learning model is operated by the wireless carrier network.

7. The one or more non-transitory computer-readable media of claim 1, wherein predicting that a particular user desires to obtain a product or a service from the specific vendor is based on the first user behavior data and not based on additional user behavior data.

8. A computer-implemented method, comprising:
receiving, from a user device of a particular user, data indicating that the particular user consents to collection of user behavior data, wherein the user device receives telecommunication services from a wireless carrier network and the user device includes a first application that is configured to collect a type of user behavior data and a second application that is configured to collect the type of user behavior data;
receiving, from the user device of the particular user, data indicating that the particular user is authorized to initiate obtaining products or services;
receiving, from the user device of the particular user, (i) a portion of the user behavior data that includes the type of user behavior data, that is collected by the first application, and that includes data identifying the first application, (ii) a remaining portion of the user behavior data that includes the type of user behavior data, that is collected by the second application, and that includes data identifying the second application, and (iii) data indicating that the user device received the portion and the remaining portion of the user behavior data;
determining that the user device was a last user device to receive the portion and the remaining portion of the user behavior data after receiving, from the user device of the particular user, the portion and the remaining portion of the user behavior data and the data indicating that the user device received the portion and the remaining portion of the user behavior data;
based on determining that the user device was the last user device to receive the portion and the remaining portion of the user behavior data after receiving, from the user device of the particular user, the portion and the remaining portion of the user behavior data and the data indicating that the user device received the portion and the remaining portion of the user behavior data, activating a component of the user device of the particular that is configured to collect biometric data;
receiving, from the component of the user device, the biometric data;
determining that the particular user is interacting with the user device based on the biometric data;
receiving anonymous historical user behavior data of other users and anonymous past product or service acquisition patterns of the other users, wherein the anonymous historical user behavior data includes data identifying a previous application that collected a corresponding portion of the anonymous historical user behavior data;
combining the anonymous historical user behavior data of the other users and the anonymous past product or service acquisition patterns of the other users;
training, using the combined anonymous historical user behavior data of the other users and anonymous past product or service acquisition patterns of the other users, a support vector machine that is configured to find, in a space of possible inputs, a hypersurface that splits triggering criteria from non-triggering events;
based on the support vector machine, generating a machine learning model that is configured to receive given user behavior data of a given user and output data predicting whether the given user desires to obtain a given product or service from a given vendor, wherein the given user behavior data includes data identifying a given application that collected a corresponding portion of the given historical user behavior data;
based on determining that the particular user is interacting with the user device and based on the data indicating that the particular user is authorized to initiate obtaining products or services, predicting, by providing, to the machine learning model, the user behavior data that includes (i) the portion of the user behavior data that includes the type of user behavior data, that is collected by the first application, and that includes the data identifying the first application and (ii) the remaining portion of the user behavior data that includes the type of user behavior data, that is collected by the second application, and that includes the data identifying the second application, that the particular user desires to obtain a product or a service based on the portion and the remaining portion of the user behavior data;
sending, via a matching platform of the wireless carrier network, a request for bids from multiple vendors of the product or the service desired by the particular user;
transmitting, via the matching platform of the wireless carrier network, one or more bids from at least one vendor for providing the product or the service to the user device for presentation by an application on the user device, the one or more bids being submitted by the at least one vendor in response to the request for bids; and
notifying, via the matching platform of the wireless carrier network, a specific vendor that submitted a bid to provide the product or the service to the particular user in response to a selection of the bid via the application on the user device.

9. The computer-implemented method of claim 8, further comprising:
triggering the application on the user device to prompt the particular user to confirm that the particular user requests to proceed with obtaining the product or the service from the specific vendor; and
canceling obtaining the product or the service from the specific vendor for the particular user in response to receiving a denial that the particular user desires to obtain the product or the service from the specific vendor.

10. The computer-implemented method of claim 8, wherein the sending includes sending the request for bids in response to receiving a confirmation from the particular user that the particular user requests to proceed with obtaining the product or the service.

11. The computer-implemented method of claim 8, further comprising receiving a predetermined fee or a predetermined percentage of a payment made by the particular user for the product or service following the specific vendor providing the product or the service to the particular user.

12. The computer-implemented method of claim 8, further comprising collecting a periodic fee from at least one of the multiple vendors for access to the matching platform.

13. The computer-implemented method of claim 8, wherein the portion and the remaining portion of the user behavior data includes a verbal communication of the particular user.

14. The computer-implemented method of claim 8, wherein the portion and the remaining portion of the user behavior data further includes at least one of user application inputs of the user to one or more applications on the user device or sensor data provided by one or more sensors of the user device, the sensor data including at least one of Global Positioning System (GPS) geolocation data, camera image data, video data, compass reading data, or accelerometer data.

15. The computer-implemented method of claim 8, wherein the matching platform includes a blockchain that stores transaction records of the matching platform in a distributed and immutable manner.

16. The computer-implemented method of claim 8, wherein the service includes an automated service provided by a machine or a service that is provided by a human service provider.

17. A system, comprising:
one or more processors; and
memory including a plurality of computer-executable components that are executable by the one or more processors to perform a plurality of actions, the plurality of actions comprising:
receiving, from a user device of a particular user, data indicating that the particular user consents to collection of user behavior data, wherein the user device includes a first application that is configured to collect a type of user behavior data and a second application that is configured to collect the type of user behavior data;
receiving, from the user device of the particular user, data indicating that the particular user is authorized to initiate obtaining products or services;
receiving, from the user device of the particular user, (i) a portion of the user behavior data that includes the type of user behavior data, that is collected by the first application, and that includes data identifying the first application, (ii) a remaining portion of the user behavior data that includes the type of user behavior data, that is collected by the second application, and that includes data identifying the second application, and (iii) data indicating that the user device received the portion and the remaining portion of the user behavior data;
determining that the user device was a last user device to receive the portion and the remaining portion of the user behavior data after receiving, from the user device of the particular user, the portion and the remaining portion of the user behavior data and the data indicating that the user device received the portion and the remaining portion of the user behavior data;
based on determining that the user device was a last user device to receive the portion and the remaining portion of the user behavior data after receiving, from the user device of the particular user, the portion and the remaining portion of the user behavior data and the data indicating that the user device received the portion and the remaining portion of the user behavior data, activating a component of the user device of the particular that is configured to collect biometric data;
receiving, from the component of the user device, the biometric data;
determining that the particular user is interacting with the user device based on the biometric data;
receiving anonymous historical user behavior data of other users and anonymous past product or service acquisition patterns of the other users, wherein the anonymous historical user behavior data includes data identifying a previous application that collected a corresponding portion of the anonymous historical user behavior data;
combining the anonymous historical user behavior data of the other users and the anonymous past product or service acquisition patterns of the other users;
training, using the combined anonymous historical user behavior data of the other users and anonymous past product or service acquisition patterns of the other users, a support vector machine that is configured to find, in a space of possible inputs, a hypersurface that splits triggering criteria from non-triggering events;
based on the support vector machine, generating a machine learning model that is configured to receive given user behavior data of a given user and output data predicting whether the given user desires to obtain a given product or service from a given vendor, wherein the given user behavior data includes data identifying a given application that collected a corresponding portion of the given historical user behavior data;
based on determining that the particular user is interacting with the user device and based on the data indicating that the particular user is authorized to initiate obtaining products or services, predicting, by providing, to the machine learning model, the user behavior data that includes (i) the portion of the user behavior data that includes the type of user behavior data, that is collected by the first application, and that includes the data identifying the first application and (ii) the remaining portion of the user behavior data that includes the type of user behavior data, that is collected by the second application, and that includes the data identifying the second application, that the particular user desires to obtain a product or a service from a specific vendor based on the portion and the remaining portion of the user behavior data;
triggering an application on the user device to prompt the particular user to confirm that the particular user requests to proceed with obtaining the product or the service from the specific vendor;
prompting the application on the user device to notify the particular user to obtain the product or the service from the specific vendor at a particular time or at a particular location; and
canceling obtaining the product or the service from the specific vendor for the particular user in response to receiving a denial that the particular user desires to obtain the product or the service.

18. The system of claim 17, wherein the specific vendor is selected by the prediction engine of the wireless carrier network from a plurality of vendors that provide the product or the service.

* * * * *